United States Patent [19]
Kress et al.

[11] 3,820,818
[45] June 28, 1974

[54] STEERING AND SUSPENSION FOR HIGH CAPACITY VEHICLES

[76] Inventors: Edward S. Kress; Ralph H. Kress, both of Box 368; Jackson C. Medley, Box 322, all of Brimfield, Ill. 61517

[22] Filed: May 12, 1972

[21] Appl. No.: 252,713

[52] U.S. Cl............................ 280/96.2 R, 267/64 R
[51] Int. Cl................................................ B62d 7/18
[58] Field of Search...................... 280/96.1, 96.2 R; 267/64 R

[56] References Cited
UNITED STATES PATENTS

| 3,042,422 | 7/1962 | Garnett | 280/96.2 R |
| 3,112,102 | 11/1963 | Messerschmitt | 267/64 R |
| 3,309,108 | 3/1967 | Wilkins | 267/64 R |
| 3,387,856 | 6/1968 | Guilhamat | 280/96.2 R |
| 3,480,096 | 11/1969 | Hammitt | 280/96.2 R |
| 3,656,632 | 4/1972 | Karakashian | 267/64 R |

FOREIGN PATENTS OR APPLICATIONS

| 869,296 | 5/1961 | Great Britain | 280/96.2 R |

Primary Examiner—Robert B. Reeves
Assistant Examiner—Thomas E. Kocovsky
Attorney, Agent, or Firm—Wolfe, Hubbard, Leydig, Voit & Osann Ltd.

[57] ABSTRACT

A combined suspension and steering system for a large bulk carrier is provided. A modified Ackerman steering gear allows the vehicle wheels to be pivoted up to 90° so that the vehicle can be turned around in approximately twice its own length. The steering knuckle arms are connected to the front suspension cylinders of the carrier and house wheel brake lines, suspension travel limit switches, and associated apparatus. An adjustable vehicle suspension includes hydro-pneumatic cylinders. Each of these cylinders has a center chamber containing a variable amount of incompressible fluid and adjacent end chambers containing a fixed amount of compressible fluids. Associated hydraulic and electrical circuitry include a self-leveling feature which may be manually over-ridden to lower or raise the vehicle body upon command. In an alternate embodiment, the suspension cylinders may be constructed to provide this self-leveling feature without the use of electrical circuitry.

6 Claims, 14 Drawing Figures

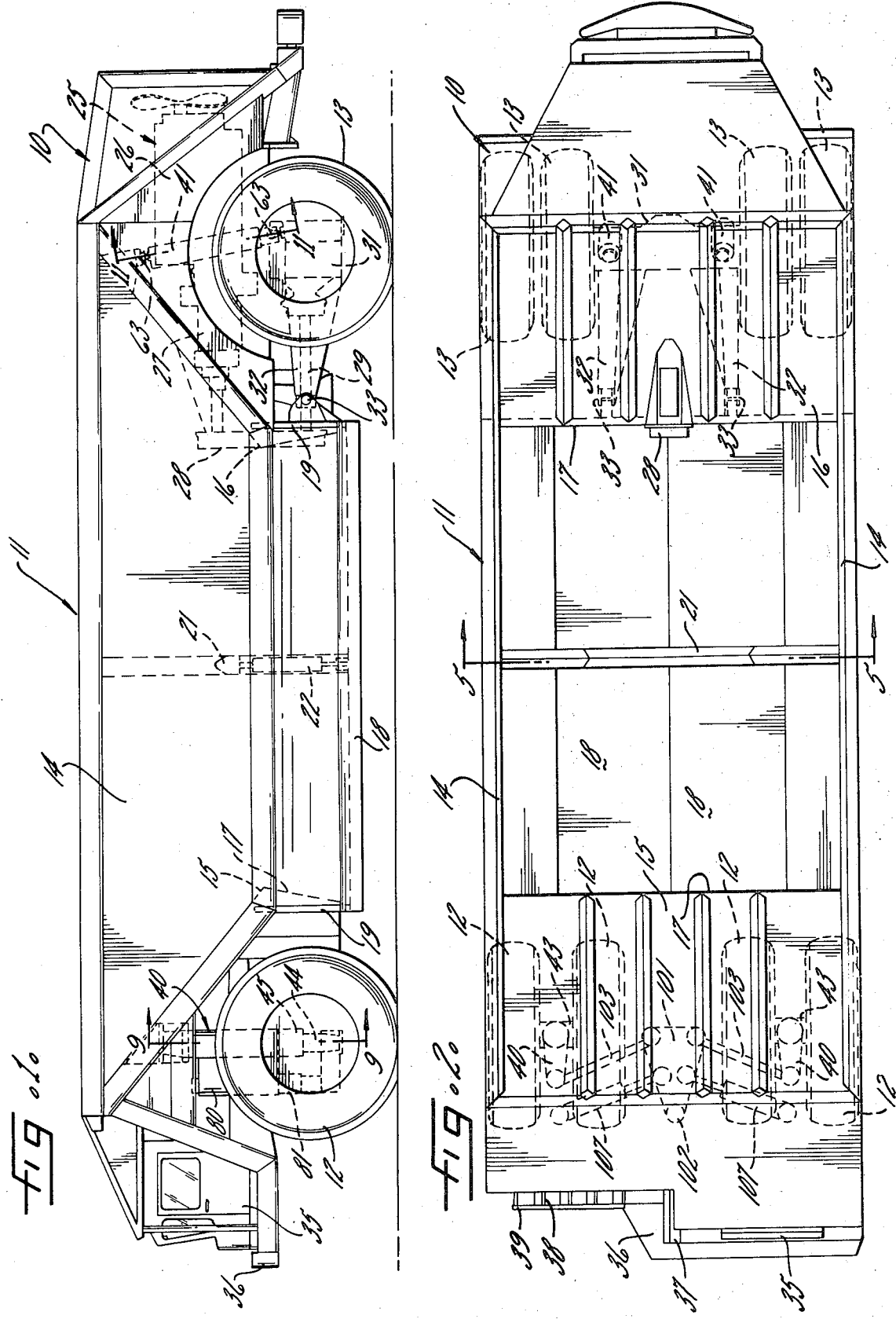

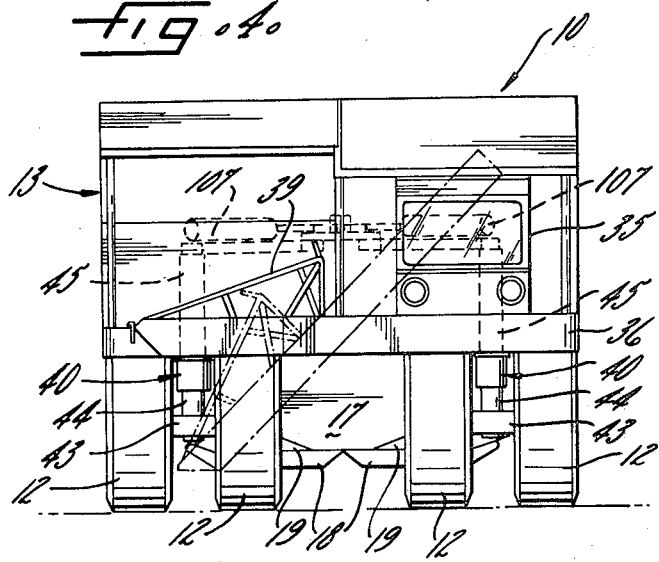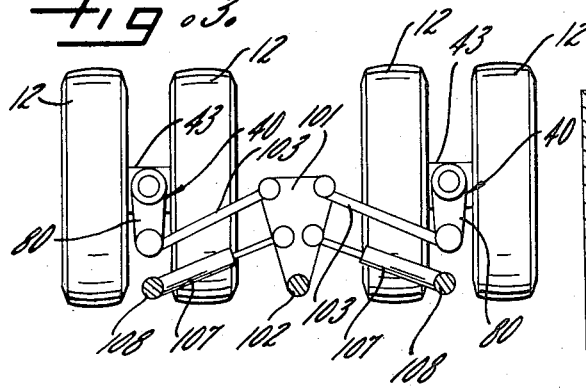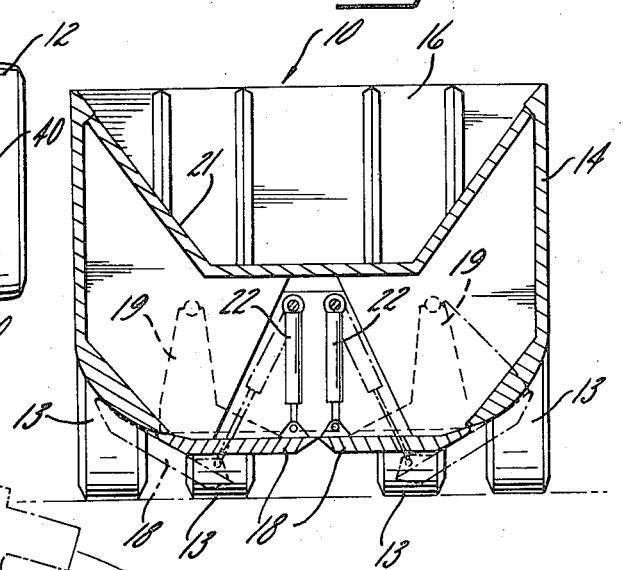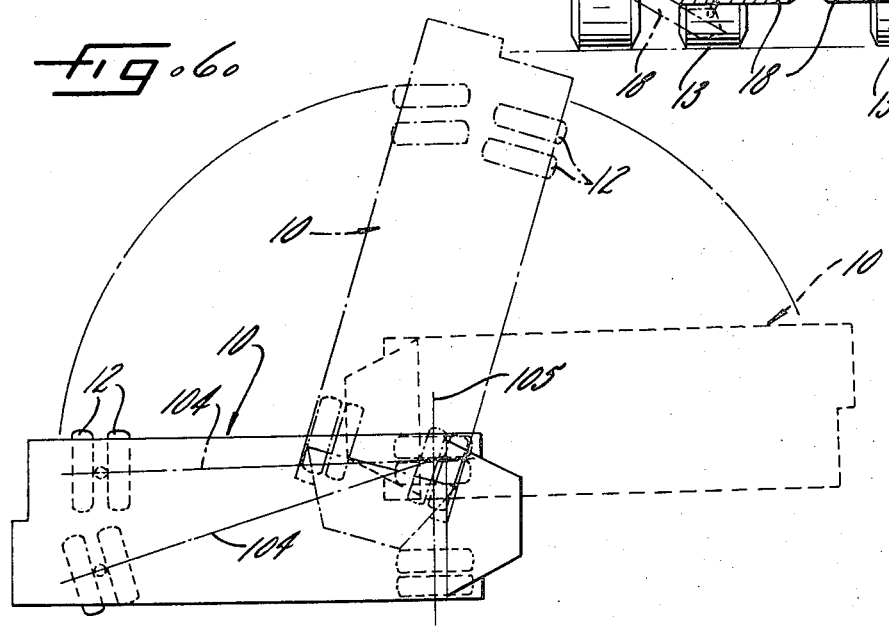

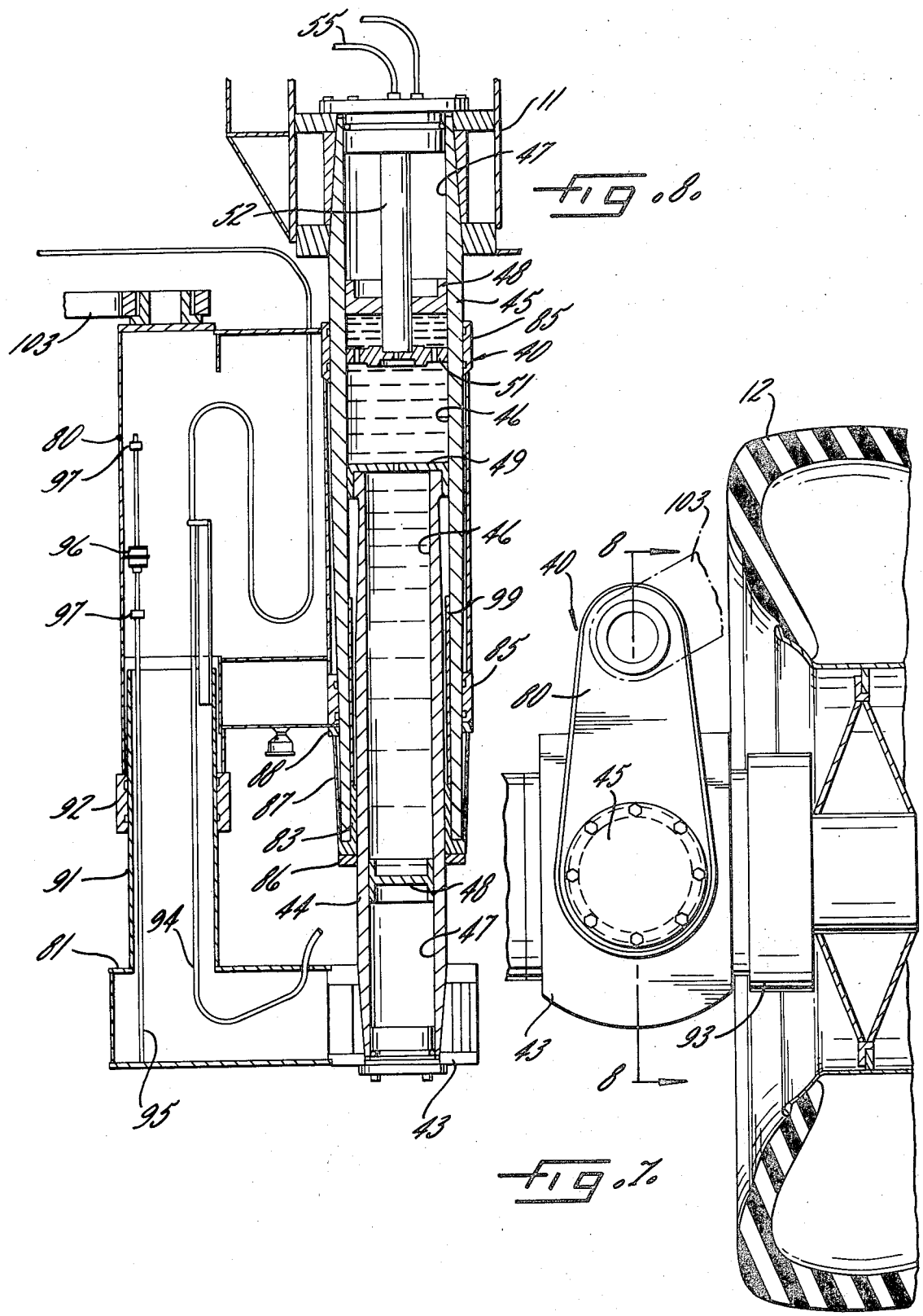

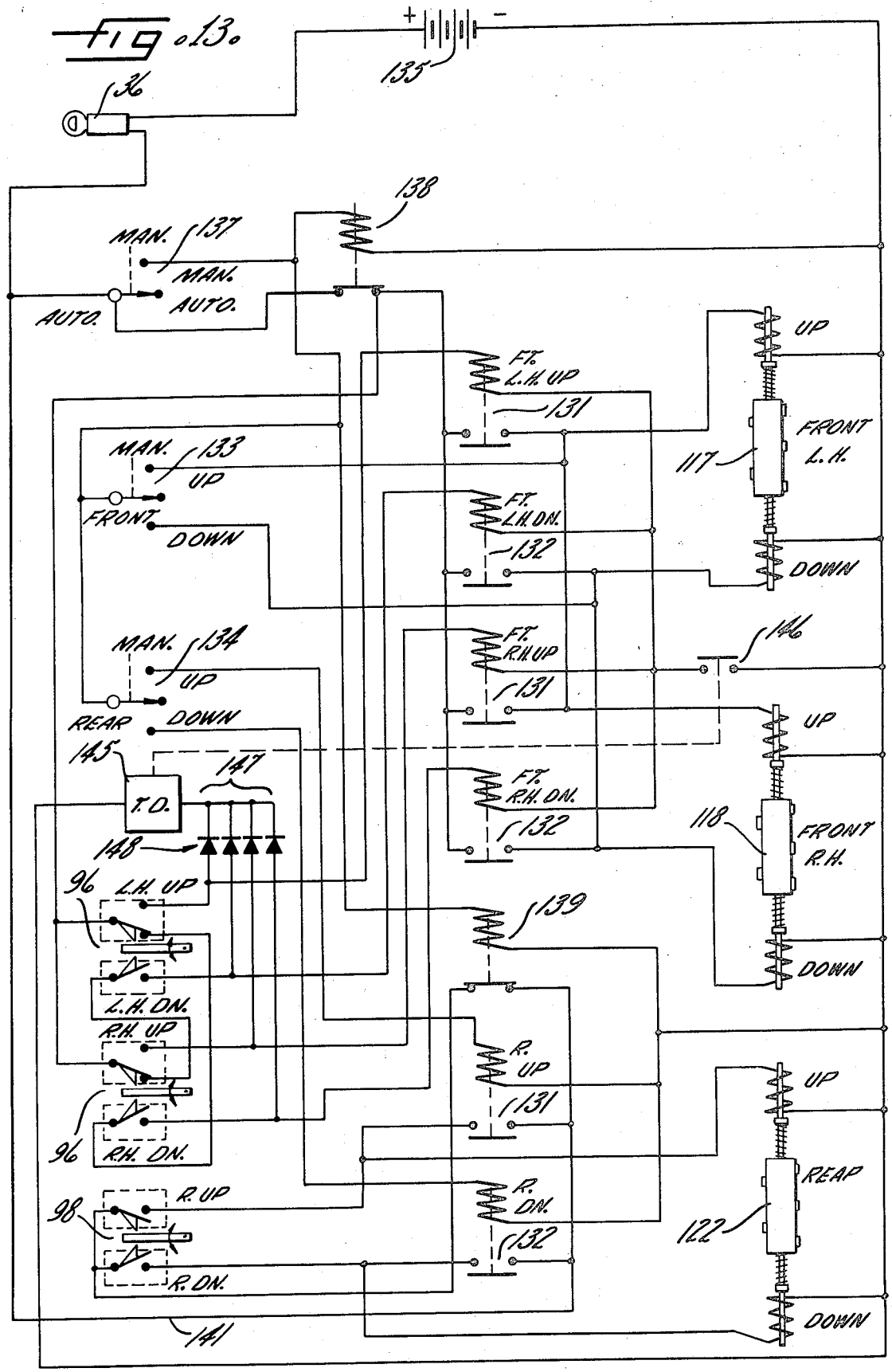

3,820,818

STEERING AND SUSPENSION FOR HIGH CAPACITY VEHICLES

This invention relates generally to high capacity hauling vehicles and more particularly concerns steering and suspension arrangements for such vehicles.

The problems with steering and supporting a vehicle, having a loaded weight measured in hundreds of tons, for high speed movement over rough roads are quite different from those encountered in the design of more conventional vehicles. However, such very high capacity vehicles can be economically utilized in bulk moving operations such as strip mining. The success of a vehicle so employed depends, of course, upon speed, capacity, ease of handling and safety.

The general aim of this invention is to provide an improved steering and suspension system for high speed, very high capacity vehicles. More specifically, it is an object of the invention to provide a steering system of the above kind which will permit turning radii as short as the length of the vehicle itself, with little or no tire scrub throughout the full turning range. Elimination of tire scrub is particularly significant when axle loadings are high.

Another object is to provide a suspension system as characterized above which gives a large vehicle a soft cushioned ride whether the vehicle is empty or loaded to several times its empty weight. A related object is to provide a system of this type that allows the vehicle to be leveled despite unequal loads on the vehicle axles and which, if desired, will automatically level the vehicle through the suspension system. A connected object is to provide a system as referred to above which gives great vehicle roll stability even at high speeds and under high loads.

Other objects and advantages of the invention will become apparent upon reading the following detailed description and upon reference to the drawings, in which:

FIG. 1 is a side elevation of a vehicle embodying the invention;

FIG. 2 is a plan of the vehicle shown in FIG. 1;

FIG. 3 is a fragmentary plan showing the front steering wheels appearing in phantom in FIG. 2;

FIG. 4 is a front elevation of the vehicle shown in FIGS. 1 and 2;

FIG. 5 is a section taken approximately along the line 5—5 of FIG. 2;

FIG. 6 is a diagram showing of the turning radius of the vehicle shown in FIG. 2;

FIG. 7 is an enlarged fragmentary section of a portion of the structure appearing in FIG. 3;

FIG. 8 is a section taken approximately along the line 8—8 in FIG. 7;

FIG. 13 is an electrical schematic of a portion of the control system embodied in the vehicle of FIG. 1; and FIG. 14 is a fragmentary section similar to FIGS. 9 and 10 but showing an alternate embodiment.

Figures 9, 10:
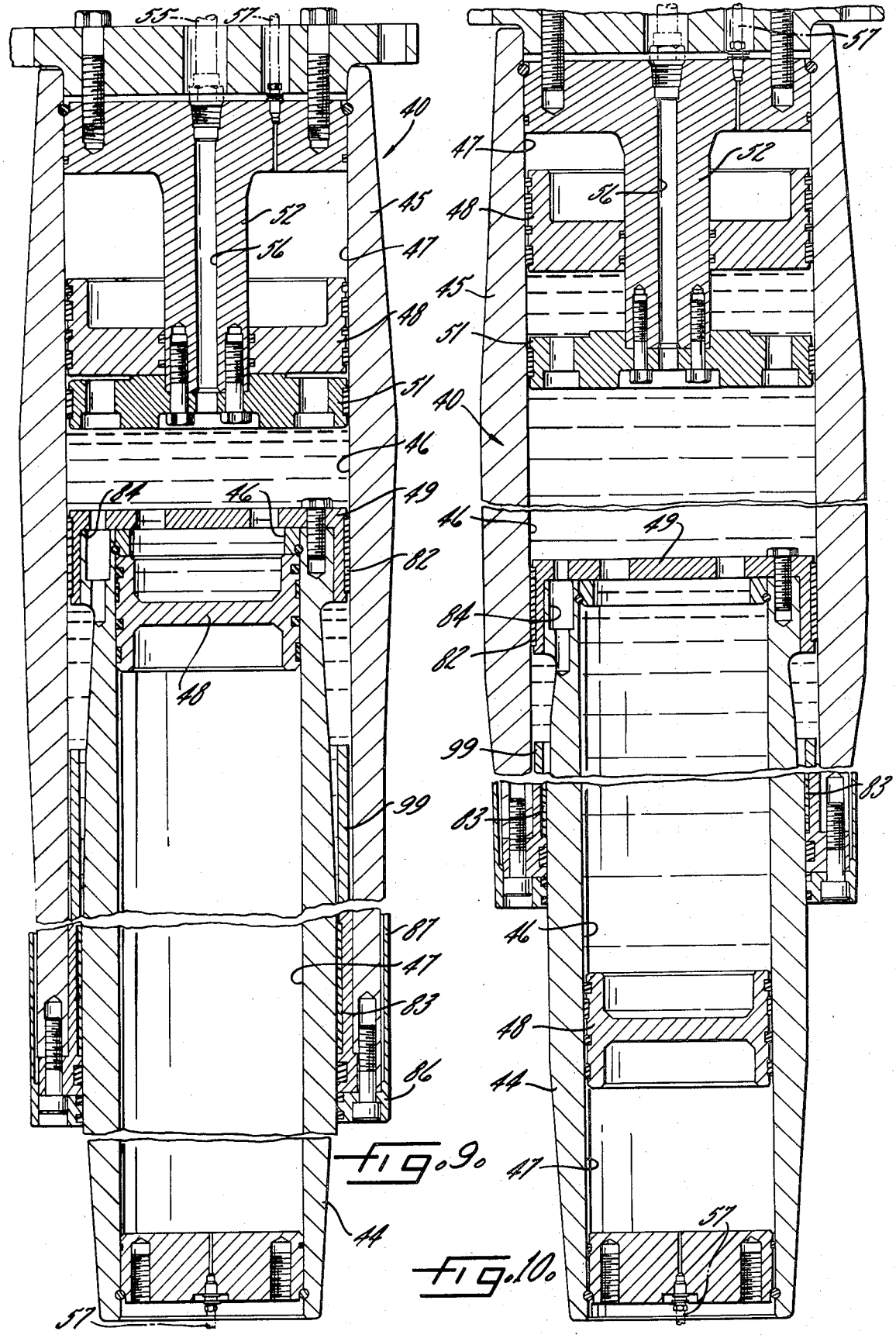
FIG. 9 is an enlarged fragmentary section taken approximately along the line 9—9 in FIG. 1.
FIG. 10 is similar to FIG. 9 with the parts occupying different positions.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Turning first to FIGS. 1 and 2, there is shown a carrier vehicle 10 having a body 11 supported on front steerable ground wheels 12 and rear drive ground wheels 13. The body 11 is essentially an open-topped hopper having vertical sidewalls 14 and inclined front and rear walls 15 and 16, respectively, leading to a lower central portion 17 whose open bottom is normally closed by a pair of swingable doors 18. The doors 18 are hung on front and rear levers 19 pivoted on the outside of the body 11 just below the walls 15, 16. A hollow open-bottomed rib 21 strengthens the center portion of the body 11 and encloses a pair of actuators 22 anchored to the body and connected to the fore and aft mid-portions of the doors 18. Extending the actuators 22 swings the doors 18 laterally to the position shown in dashed lines, FIG. 5, so as to empty the body 11. As will be apparent to those familiar with this art, the vehicle 10 is loaded from the top using shovels or the like, driven to a discharge point, and emptied by opening the doors 18. To give some idea of scale, the illustrated vehicle 10 weighs about 50 tons empty, has an overall length of about 50 feet, is about 16 feet wide and is capable of carrying 150 tons of pay load.

For powering the vehicle 10, a power module 25 is enclosed in a chamber over the rear wheels 13 and under the wall 16. The module 25, preferably a unitary package for facilitating installation and servicing, includes an engine 26 and a variable speed transmission 27 coupled to a gear transfer case 28. A drive shaft 29 couples the case 28 to rear axles through a differential within a housing 31. The housing 31 is mounted for up and down movement, relative to the body 11 by being secured to suspension trail arms 32 pivoted at 33 on the body 11. The module 25 also includes the usual engine accessories and, by enclosing the module, it is protected, can be provided with filtered air, and is largely noise insulated.

The controls for the vehicle 10 are located in an operator's cab 35 at the forward end of the body 11 and offset to one lateral side. Because of the proportions of the vehicle, this places the cab well above the ground and, as a feature of the invention, a beam 36 running laterally below and forward of the cab 35 is pivoted at 37 for rotation about a fore-and-aft axis at the approximate center of the body, and a ladder structure, including steps 38 and a handrail 39, is secured to the beam 36 laterally adjacent the cab 35 with the beam being proportioned to counterweight the ladder structure. When the beam is level, it forms a decorative bumper-like structure shown in sold lines in FIG. 4. Swinging the beam 36 to the dashed line position of FIG. 4 provides easy access to the cab 35, and the beam not only counterweights the ladder structure 38, 39 for easy movement, but when the ladder structure is down the beam extends in front of the cab 35 as a visual indicator that the ladder is not up in vehicle operating position.

In carrying out the invention, the weight of the body 11 is transferred to the ground wheels 12, 13 through a pair of front steering and suspension assemblies 40 and a pair of rear suspension assemblies 41 which, in each case, provide a very soft ride through an extremely wide range of loads and also permit either automatic or manual leveling of the vehicle 11 by adjusting the vertical position of the vehicle relative to the wheels 12, 13. Considering first the front assemblies 40, in the preferred construction pairs of wheels 12 are mounted on short axles 43, and the assemblies 40 include vertical cylinders 44 secured to the axles 43 and upper cylinders 45 fitted in telescoping relation with the vertical cylinders 44 and being rigidly fixed to the vehicle body 11 (see also FIG. 8). For cushioning relative telescoping movement, the cylinders 44, 45 contain chambers 46 containing relatively incompressible fluid, such as hydraulic oil, and chambers 47 filled with relatively compressible fluid, such as nitrogen gas (see also FIGS. 9 and 10). Preferably, each cylinder 44, 45 defines chambers 46, 47 for both compressible and incompressible fluids, and floating pistons 48 separate the chambers. When one of the assemblies 40 is loaded axially, the oil in the chambers 46 reacts against the compressible gas in the chambers 47 through the pistons 48 so as to give a soft, cushioned ride.

To limit piston movement, each cylinder 44 is provided with a perforated end plate 49, and a perforated disc 51 is fixed to a stem 52 in the cylinder 45. Thus, with no vertical load on the assemblies 40, the cylinders 44, 45 are extended until the pistons 48 abut, respectively, the end plate 49 and the disc 51 (see FIG. 9). Since, with the cylinders fully extended, the volumes of the chambers 47 are quite different in the respective cylinders 44, 45, the initial gas pressures within those chambers are varied. In the illustrated embodiment, an initial pressure of 1,000 psi in the chamber 47 of each cylinder 45 and an initial pressure of 200 psi in the chamber 47 of each cylinder 44 gives good operating characteristics.

In order to permit vehicle leveling and achieve wide loading ranges, the suspension assemblies 40, 41 permit the volume of incompressible fluid, which is the hydraulic oil, to be selectively varied. In the case of each assembly 40, the fluid volume is controlled through a line 55 connected to a passage 56 in the stem 52. The structural integrity of the cylinder 45 is therefore not affected as would be the case if a passage were formed in the cylinder wall. By introducing fluid to the chambers 46, it being noted that the end plate 49 is completely open to oil flow, the overall telescoped length of the cylinders 44, 45 can be held approximately constant as the chambers 47 are reduced in volume to bear the load and permit the assembly to receive the oil while still giving a soft cushioned ride. Moreover, if the vehicle 11 is loaded so as to tilt from level, it can be releveled by causing the suspension assemblies 40, 41 to assume substantially uniform lengths, even though their loadings might differ significantly, through the selective introduction of oil to one or more of the suspension assemblies.

When fully loaded, the piston 48 in the cylinder 44 closely approaches the outer end of that cylinder since, as mentioned above, the underlying chamber 47 was preferably initially charged to a relatively low pressure. Under full loading conditions, the piston 48 in the upper cylinder 45 is held spaced from the outer end of that cylinder by the substantially higher initial charging pressure in the adjacent chamber 47 (see FIG. 10). This latter chamber thus gives a good cushioning range under full load so that the vehicle can absorb overload shocks as encountered during high speed travel under off-the-road conditions. In order to initially charge the chambers 47 and to maintain proper gas pressure, lines 57 are provided leading to passages into the chambers 47 from a suitable gas supply or gas receiving station.

Figure 11:
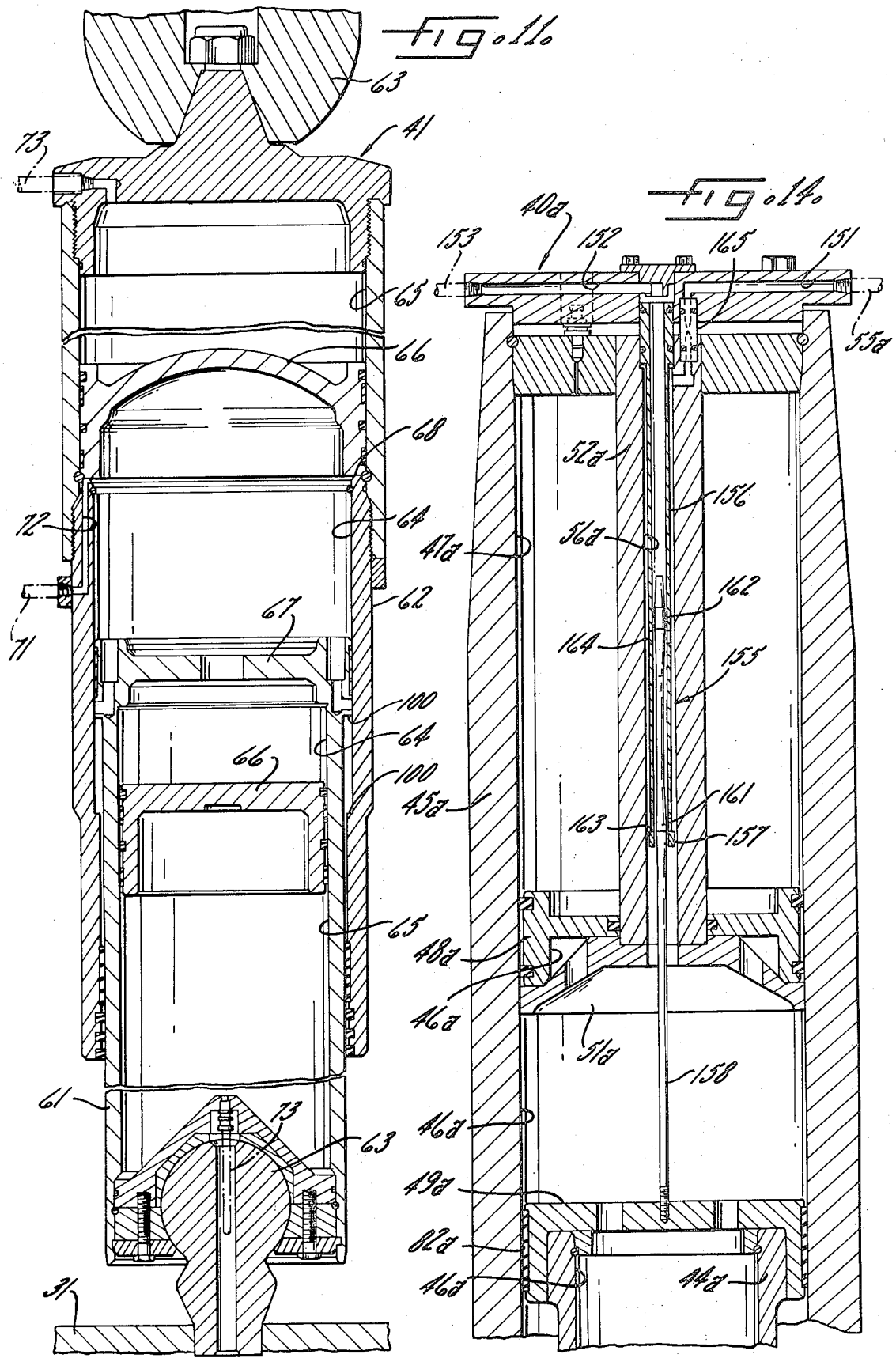
FIG. 11 is an enlarged fragmentary section taken approximately along the line 11—11 in FIG. 1.

The assemblies 41 are structurally and operationally similar to the assemblies 40 as so far described, each having a vertical cylinder 61 connected to the rear axle housing 31 and an upper cylinder 62 fitted in telescoping relation on the vertical cylinder 61 and connected to the vehicle 11 (see also FIG. 11). Ball joints 63 connect the cylinders 61, 62 to both the vehicle and the axle housing so as to give the desired axle flexibility. The cylinders provide chambers 64 for relatively incompressible fluid and chambers 65 for relatively compressible fluid, and floating pistons 66 separate the chambers. An end plate 67 provides a stop for the piston 66 in the cylinder 61, and a shoulder 68 in the cylinder 62, which in this case is made in two parts, provides a stop for the piston in that cylinder.

Incompressible fluid, oil, is introduced into the chambers 64 of each assembly 41 through a line 71 and a passage 72, and compressible fluid, nitrogen, is introduced into the chambers 65 from lines 73. Since the cylinders 62 are subject to less bending and torsional loading than are the cylinders 45 they are formed in two sections so as to define the shoulder 68, and the passage 72 is formed in the sidewall of one of the sections. Operation of the assemblies 41 corresponds to that described above in connection with the suspension function of the assemblies 40.

Pursuant to the invention, the assemblies 40 are steering as well as suspension devices and, for this function, in each of the assemblies 40 the upper cylinder 45 is fitted in rotating relation with the vertical cylinder 44, and a laterally offset housing 80 is mounted on the cylinders 44, 45 for rotation relative to the upper cylinder 45 and is formed with a lower vertically telescoping portion 81 fixed for rotation with the vertical cylinder 44 and thus with the axle 43. In the illustrated arrangement, the end plate 49 mounts one bushing 82 interposed between the cylinders 44, 45 (see FIGS. 9 and 10), and another bushing 83 between these cylinders is mounted at the lower end of the upper cylinder 45. A passage 84 allows oil from the chambers 46 to lubricate the bushing 83. To rotatably mount the housing 80, the housing preferably has sleeve bearings 85 fitted on the outside of the cylinder 45, and a collar 86 is fastened to the cylinder 45 to lock in the bearing 83 and provide a skirt 87 supporting a bearing ring 88 that supports the housing 80 vertically on the cylinder 45.

In the preferred construction, the telescoping housing portion 81 has a cylindrical column 91 closely fitted in a bearing 92 mounted on the housing 80 so that the parts slide freely vertically and yet transmit forces torsionally about the axis defined by the relatively rotating cylinders 44, 45. Thus, the housing 80 serves as a knuckle arm for steering the axle 43 about the vertical axis defined by the cylinders.

As a feature of the invention, the housing 80 is hollow and serves as a shielding conduit. One wheel 12 of each of the axle pairs is provided with a brake 93, the other wheel being left unbraked for reliable steering, and a brake control line 94 is disposed within each of the housings 80 running from the housing top to the adjacent brake 93 with sufficient slack in the housing to permit telescoping movement of the cylinders 44, 45 and the housing 80. In this way, a relatively long brake line 94 is conducted down to the brake from the vehicle body in a shielding protecting conduit. Preferably, each housing 80 also contains an actuator rod 95 fixed within the housing portion 81 and a double throw switch 96 secured within the housing itself. Telescoping movement of the housing through a limited range causes projections 97 on the rod 95 to trip the double throw switch 96 in one direction or the other. A switch 96 is mounted in each of the housings 80, and a similar switch 98 (see FIG. 13) is mounted to sense the vertical spacing of the rear axle housing 31 from the vehicle body 11. In this way, three-point sensing of the vertical relation between the vehicle body 11 and the ground is obtained and, in a manner to be described below, actuation of the switches 96, 98 extend or retract the cylinders of the suspension assemblies 40, 41 to keep the vehicle 10 automatically leveled.

To avoid overextending the cylinders 44, 45, a sleeve 99 is fitted within the cylinder 45 on the bearing 83 in position to abut the bearing 82 and define the extension limits for the cylinders. This assembly avoids affecting the structural integrity of the cylinders 44, 45 so that they are better able to withstand the loads imposed upon them. In the case of the rear cylinders 61, 62, opposed shoulders 100 are provided on the respective cylinders to provide extended limit stops.

In carrying out one aspect of the invention, the vehicle 10 is given an extremely short, proportionally, turning radius by a whiffle tree 101 pivoted at 102 on the body 11 and coupled by steering arms 103 to the assemblies 40 functioning as knuckle arms. The short turning radius, virtually without tire scrub, is achieved by proportioning the effective lengths of the steering arms 103, which are equal, the effective lengths of the knuckle arms 40, which are also equal, and the pivot points of the whiffle tree 101, so that the wheel axles 43 can be pivoted from a position of axial alinement (FIG. 3) to a position substantially 90° from said alinement (FIG. 6) wherein produced center lines 104 of the front pivoted axles intersect on a center line 105 of the rear axle axis. Effective length means, of course, the dimension between respective ones of the pivot points of the knuckle arm assemblies 40, whiffle tree 101 and steering arms 103. In a practical case, the effective lengths of these parts can be set by trial and error draftman's layout procedures since the end conditions, straight ahead alinement and intersection of the lines 104, 105 are known. As one example, a vehicle having a wheel base of 392 inches and a spacing of 131 inches between the pivot axes of the steerable wheels 12, will produce the desired steering action with an effective knuckle arm length of 23 inches, effective steering arm length of 52-½ inches and a whiffle tree proportioned so that there is a 34-inch spacing between the connecting points of the steering arms and a 55-inch spacing between those points and the whiffle tree pivot 102. In this example, the wheel base to steering wheel width ratio is 2.99 to 1 and, for vehicles having that same ratio, the proper effective lengths of the steering parts will be proportional to those given in the example.

For powering the steering of the vehicle 10, a pair of actuators 107, anchored at 108 and 109 to the vehicle body 11, are connected to the whiffle tree 101. The actuators are preferably operated independently to give double, or backup, reliability for the steering of the vehicle.

To provide the relatively large amounts of hydraulic fluid at the required high pressures demanded by the assemblies 40, 41, the vehicle 10 includes an accumulator 111 (see FIG. 12) kept charged by a pump 112 from a reservoir 113 through a pressure control valve 114. As will be apparent to those familiar with the art, when the pressure within the accumulator 111 reaches the level for which the valve 114 is set, that pressure, acting through a passage 115, opens the output of the pump 112 to the reservoir 113 through a line 116.

The two assemblies 40 are individually extended and retracted through three-way solenoid operated valves 117 and 118 interposed between the assemblies and both the accumulator 111, via the line 119, and the reservoir 113, via the line 121. A single solenoid operated three-way valve 122 controls both of the rear suspension assemblies 41 through a line 123 and lines 124 and 125 leading, respectively, to the accumulator 111 and the reservoir 113.

The valves 117, 118, 122 can be operated either manually, so that the operator in the cab 35 can extend or retract the assemblies 40, 41, or automatically by responce to actuation of the switches 96, 98 (see FIG. 13). Each of the three valves is controlled by an up relay 131 and a down relay 132 as well as a manual switch 133 for both the valves 117, 118 and a manual switch 134 for the valve 122. The circuit is energized from a source 135 through a key switch 136. A mode selection switch 137 permits the vehicle operator to select either manual or automatic operation. When the switch 137 is moved from its illustrated position to its manual position, control relays 138 and 139 are picked up and current is supplied to the manual switches 133, 134. Picking up of the relay 138 opens the circuit from the key switch 136 to the up and down relays 131, 132 of the valves 117, 118 so that the relays become ineffective. Movement of the manual switch 133 to either its up or down position energizes the appropriate solenoid for both of the valves 117, 118. Movement of the manual switch 134 to either its up or down position energizes the appropriate one of the relays 131, 132 for the valve 122 which, in turn, direct current from a line 141 to either the up or down solenoid of the valve 122.

Returning the mode selection switch 137 to the illustrated automatic position drops out the control relays 138, 139 thereby closing their respective contacts. Closing the contacts for the relay 138 provides power both to the switches 96 and to the up and down relays 131, 132 for the valves 117, 118. Closing of the contacts of the control relay 139 provides power, from the line 141, to the switch 98. Actuation of the switch 98 in either the up or down direction directly energizes either the up or down solenoid of the control valve 122. Operation of either switch 96 in either the up or down direction energizes the associated one of the up or down relays 131, 132 associated with the control valves 117, 118 so as to operate the valves in the appropriate direction.

In connection with the description of how one of the switches 96 is operated (see FIG. 8), it was pointed out that some range of motion between the cylinders in the suspension assemblies was required before one of the switches 96, 98 was operated in either an up or down direction. This has the effect of preventing travel vibration, road bumps and the like from causing frequent and opposite operation, i.e., chattering, of the electrical and hydraulic control circuits. To further insure against undesirable side-to-side oscillations which could be caused by allowing the control system for the front suspension assemblies 40 to respond independently to transient conditions such as might be caused by one set of wheels 12 or the other encountering a bump or a rut in the road, or by centrifugal force of the heavily loaded vehicle is briefly turned while traveling at high speed, a time delay relay 145 is provided with normally open contacts 146 interposed in the line from the power source 135 which energizes one side of the up and down relays 131, 132 for each of the valves 117, 118. The relay 145 is picked up when energized through one of the lines 147 for a given time period which, in the illustrated construction, is on the order of four seconds. The lines 147 direct current to the relay 145 through one of a set of diodes 148 whenever either switch 96 is moved to either the up or down actuated position. Thus, the switches 96 must remain operated for a minimum of four seconds before the associated one of the relays 131, 132 will be picked up to operate either the valve 117 or the alternate valve 118.

In this way, when the vehicle 10 is turning, centrifugal tilting and the increased load on the suspension assembly 40 on the outside of the turn, which load can of course be considerable at high speeds with the vehicle heavily loaded, will be compensated if the turn lasts more than four seconds by additional fluid being directed to that one of the assemblies 40 so that the vehicle is laterally leveled and stabilized. This gives the vehicle a very good roll stability even when heavily loaded and traveling at high speeds.

Figure 12:
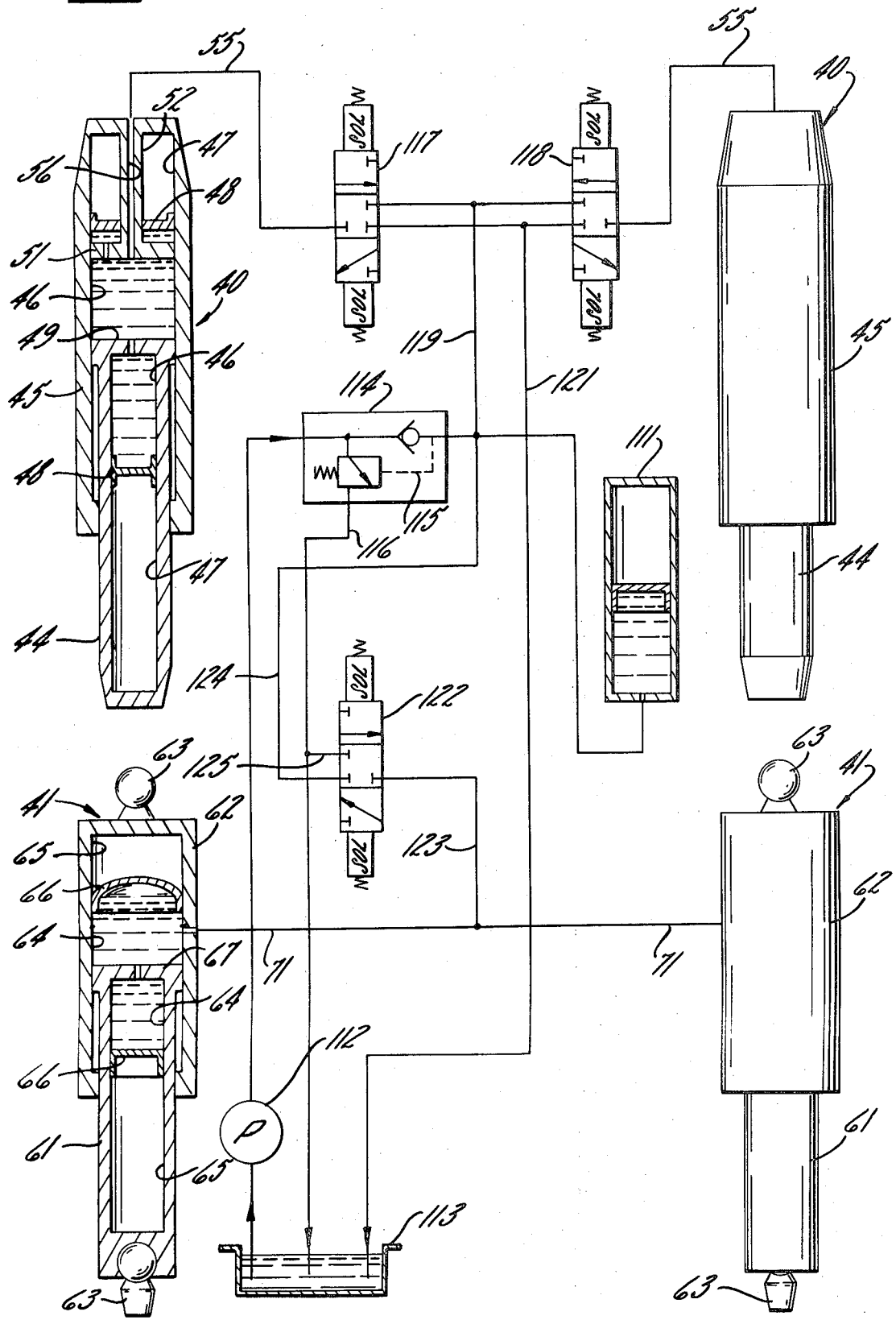
FIG. 12 is a hydraulic diagram of a portion of the control system embodied in the vehicle of FIG. 1.

An alternative embodiment for automatically holding the suspension assemblies 40, 41 at a substantially constant length under varying loads is shown in FIG. 12 wherein parts corresponding to those already described have been given the same reference numerals with the distinguishing suffix *a* added. In this embodiment, an assembly 40a includes a vertical cylinder 44a, with an end plate 49a, rotatably and slidably fitted in an upper cylinder 45a on bushings 82a. Chambers 46a contain incompressible fluid, oil, and a chamber 47a contains compressible fluid, nitrogen, separated from the chambers 46a by a floating piston 48a which, in the illustrated position, is adjacent a stop disc 51a mounted on a stem 52a.

In carrying out this feature of the invention, oil inlet and outlet passages 151 and 152, respectively, are formed in the head of the cylinder 45a, the former connected to the accumulator 111 by a line 55a and the latter connected to the reservoir 113 by a line 153, and a valve assembly 155 admits or releases fluid from the chambers 46a in response to relative sliding movement of the cylinders 44a, 45a. In the illustrated form, the valve assembly 155 includes a hollow sleeve 156 fitted in a passage 56a in the stem 52a with the center of the sleeve 156 open to the outlet passage 152 and the periphery of the sleeve open to the inlet passage 151. The annular chamber defined by the periphery of the sleeve 156 and the passage 56a is blocked from the chambers 46a by a collar 157 at the lower end of the sleeve 156. A rod-like valve piston 158 is secured to the vertical cylinder end plate 49a and formed with lands 161 and 162 which fill the interior of the sleeve 156 adjacent, respectively, openings 163 and 164 in the wall of the sleeve 156. A flow restriction member 165 is interposed between the passage 151 and the annular passage surrounding the sleeve 156.

With the parts in their illustrated position, the land 161 fills the collar 157 and blocks fluid flow either in or out of the chambers 46a. When the axial load on the assembly 40a is increased, the cylinder 45a moves down on the cylinder 44a and, relatively speaking, the land 161 moves up the sleeve 156 so as to clear the passage 163 thereby admitting fluid from the passage 151 through the flow restriction member 165 down the outside of the sleeve 156 and into the chambers 46a. Additional fluid is supplied to these chambers until the relative positions of the cylinders 44a, 45a is restored to that required for the land 161 to block further fluid flow into the chambers 46a. When that axial load is relieved, the compressible fluid in the chamber 46a extends the assembly 40a and, when the land 162 moves downwardly, relatively, of the openings 164, the land 161 having at the same time moved relatively downwardly and out of the collar 157, fluid is exhausted from the chambers 46a by flowing up through the center of the collar 157, out of the openings 163, again up between the sleeve 156 and the passage 56a, through the openings 164, and into the center of the sleeve 156 to the exhaust or outlet passage 152. It will be appreciated that, at the same time, fluid will be flowing into the system from the passage 151 but the flow restriction member 165 limits this flow to a rate substantially less than that at which fluid is discharged from the chambers 46a so that the net effect is a reduction of the volume of fluid in those chambers.

The valve assembly 155 thus provides a way to mechanically control the length of the assembly 40a without relying on electrical sensing circuits and electrically controlled valves.

We claim as our invention:

1. A wheeled vehicle steering and suspension assembly comprising, in combination:
   an axle adapted to support a ground wheel;
   a lower vertical cylinder secured to said axle for up and down and turning movement therewith;
   a vertical upper cylinder fitted in both telescoping and rotating relation with said lower cylinder and adapted to be fixed to a vehicle;
   means within said cylinders for cushioning relative telescoping movement thereof upon up and down movement of said axle;
   a laterally offset member mounted for rotation on said upper cylinder, said member having a lower vertically telescoping portion fixed to said lower cylinder for rotation therewith and thus said axle;
   means on said member for coupling the same to a steering arm so that the member can serve as a knuckle arm, said telescoping portion serving to transmit force from said steering arm torsionally to said lower cylinder to rotate the latter and thus steer the axle;
   said cushioning means including a first chamber filled with a liquid, a second chamber filled with gas, and a floating piston separating said chambers;
   a source of liquid under pressure and a connection from said source to said first chamber;
   and valve means for controlling the supply of liquid from said source to said first chamber to permit adjustment of the telescoped length of said cylinders under varying loadings.

2. A wheeled vehicle steering and suspension assembly according to claim 10 including means for sensing the telescoped relation of said cylinders, and wherein said valve means is both manually operable for raising and lowering the vehicle and automatically operable by said sensing means for leveling the vehicle by maintaining the telescoped length of said cylinders substantially constant under varying loadings.

3. A wheeled vehicle steering and suspension assembly according to claim 1 in which the member and its telescoping portion are hollow and include means for sensing the telescoped relation thereof and thereby signal the telescoped relation of said cylinders, and further including an electrical circuit connecting said valve means for operation by said sensing means to maintain the telescoped length of said cylinders substantially constant under varying loadings.

4. A wheeled vehicle steering and suspension assembly according to claim 1 in which the member and its telescoping portion are hollow and provide a housing, and further including means within said housing for sensing the telescoped relation of said portion and thereby the telescoped relation of said cylinders, and means for operating said valve means from said sensing means to maintain the telescoped length of said cylinders substantially constant under varying loadings.

5. A wheeled vehicle steering and suspension assembly according to claim 1 in which the member and its telescoping portion are hollow and provide a housing, and further including a brake mounted on said axle for said wheel, a brake control line disposed within said housing from the top of the housing to said brake with sufficient line slack in the housing to permit telescoping movement of the member and said portion, means mounted within said housing for sensing the telescoped relation of said portion and thereby the telescoped relation of said cylinders, and means connecting said valve means for operation by said sensing means to maintain the telescoped length of said cylinders substantially constant under varying loadings.

6. A wheeled vehicle steering and suspension assembly comprising, in combination:

an axle adaptable to support a ground wheel;
a lower vertical suspension cylinder secured to said axle for up and down and turning movement therewith;
an upper vertical suspension cylinder fitted in telescoping and rotating relation with said lower cylinder and adapted to be fixed to a vehicle;
means within said suspension cylinders for cushioning relative telescoping movement thereof including floating pistons in both said cylinders defining therebetween a center chamber filled with liquid, and a separate chamber at the ends of said cylinders, filled, respectively, with gas at different initial pressures, such that at light vehicle loadings the end chamber with the lower gas pressure provides a shock cushion and at higher vehicle loadings the end chamber with the higher gas pressure provides a shock cushion;
a tubular member stemming from the upper end of said upper cylinder along the axis thereof through one of said floating pistons and providing a conduit to supply liquid to said center chamber;
a source of liquid under pressure and a connection from said source to said conduit;
valve means in said connection for controlling the supply of liquid from said source via said conduit to said center liquid chamber to permit adjustment of the telescoped length of said cylinder under varying loadings;
a laterally offset upper steering member rotatably carried on the exterior of said upper cylinder and fixed against vertical movement relative thereto, said upper steering member extending laterally and carrying means for coupling the same to a steering arm so that said steering member can serve as a knuckler arm;
said upper steering member having a lower vertically telescoping portion fixed for rotation with said lower cylinder and thus said axle, said telescoping portion serving to transmit force from said steering arm torsionally to said lower cylinder to rotate the same and thus steer the axle;
said steering member and its telescoping portion being hollow and including means for sensing the telescoped relation of said portion; and
means for operating said valve means from said sensing means for automatically adjusting the supply of liquid to said center chamber to maintain the telescoped length of said cylinders substantially constant under varying loadings.

* * * * *